Nov. 24, 1953                I. ELLIOTT                2,660,131

MACHINE FOR PRODUCING EXTRUDED UNITS

Filed Dec. 14, 1948                                2 Sheets-Sheet 1

INVENTOR.
Irwin Elliott
BY Burgess, Ryan and Hicks

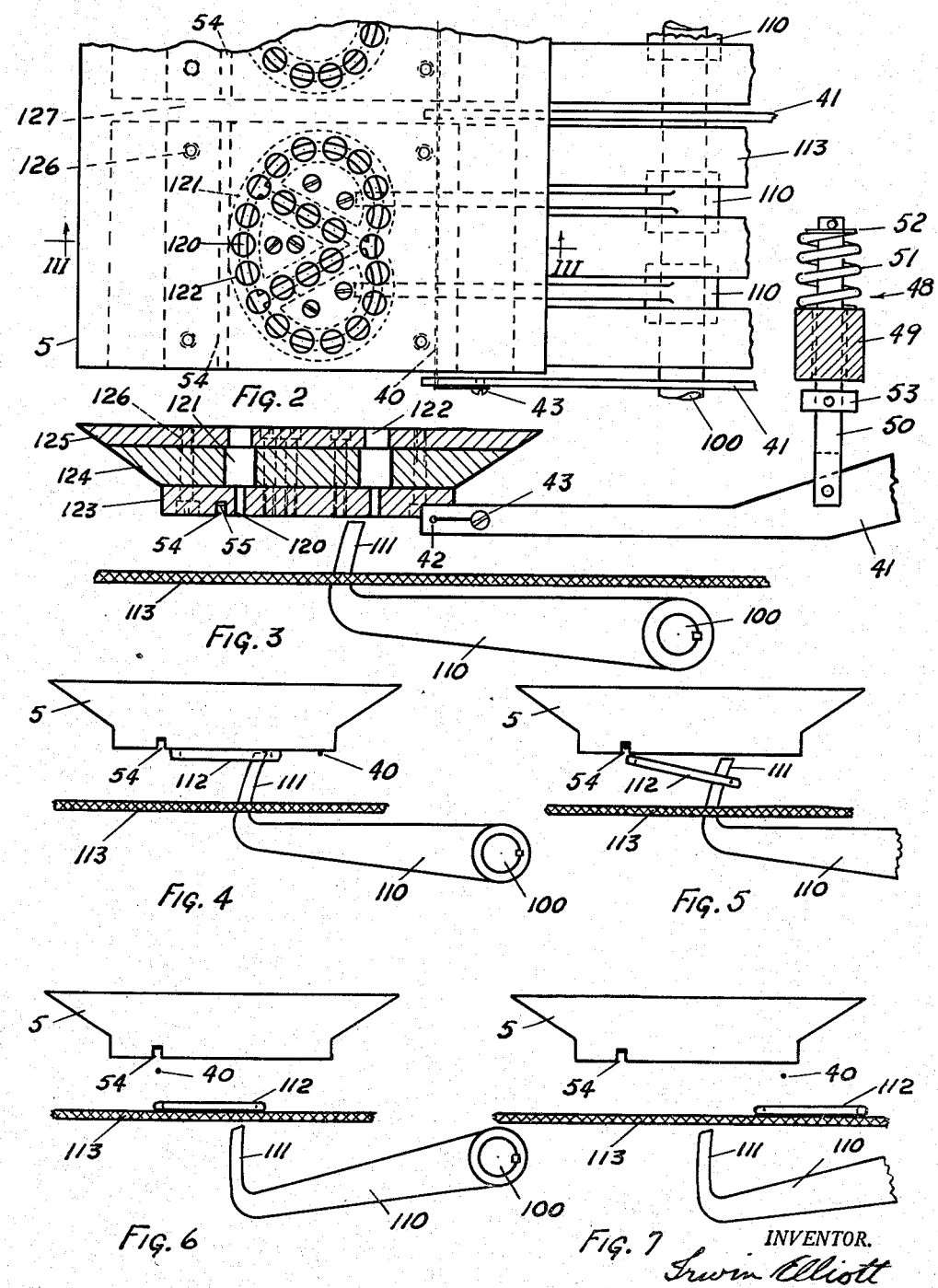

Patented Nov. 24, 1953

2,660,131

UNITED STATES PATENT OFFICE 2,660,131

MACHINE FOR PRODUCING EXTRUDED UNITS

Irwin Elliott, Croton-on-Hudson, N. Y., assignor of one-half to Christopher G. Papalexis and Gregory C. Papalexis, Bronx, N. Y.

Application December 14, 1948, Serial No. 65,215

4 Claims. (Cl. 107—14)

This invention relates to apparatus for forming shaped units of extrudable material and involves the continuous extrusion of the material through a die and the periodic severance of the same as it is extruded. A primary object of the invention is to effect a clean, undistorted cut of the extruded material leaving the die, even when the material is of a stiff, elastic character. Another object is to provide a die that will insure an even, uniform flow of extruded material therefrom. Other objects and advantages will become apparent as the description proceeds.

While not limited thereto, the invention has particular application to the production of shaped units of dough or batter which are subsequently baked to form such items as cakes, cookies, pretzels, and sundry others. One of the problems frequently encountered in this field is the tendency of the extruded material, at the end of a cutting stroke, to cling to the cutter and thereby distort the cut. Also, and as a direct result of such tendency, the material clinging to the cutter is required to be removed before the next cut, and time and/or means for this purpose must be provided as otherwise the cutting action will be impaired. These difficulties, naturally, have unfavorably affected the appearance of the products and have resulted in increased costs. According to the invention, it is proposed to prevent the tendency of the material to cling to the cutter by moving the cutter first through the extruded material, in contact with the extrusion face of the die, and then, after it has passed the far side of the said material, in a direction substantially opposite to the direction of extrusion. The change in the direction of movement of the cutter is preferably brought about sharply, as by a snapping action, to better insure the separation of the cutter from the material.

In general, apparatus for carrying out the invention may comprise, briefly, a die as hereinafter described, means for continuously feeding extrudable material to one side of the die for extrusion therethrough, a movable cutter on the other side of the die for cutting the extruded material into units, means for moving the cutter back and forth across the die in a continuous series of cutting and return strokes, and means for moving the cutter at the conclusion of each cutting stroke in a direction substantially opposite to the direction of movement of the material being extruded. In cooperation with the latter means a space or opening is provided, preferably in the die itself, for receiving the cutter.

For illustrative purposes the invention will be described in connection with the forming of dough into pretzel units, although, as described, other units of the same or different extrudable material may be formed. The invention is not concerned with the subsequent baking of the dough units to form the finished pretzels. In the accompanying drawings:

Fig. 2 is an enlarged, broken-off, plan view of the die used for forming the pretzel units;

Fig. 3 is a sectional view taken along the line III—III of Fig. 2; and

Figs. 4 to 7 are more or less diagrammatic views showing various stages in the cutting of an extruded portion of material.

Figure 1:
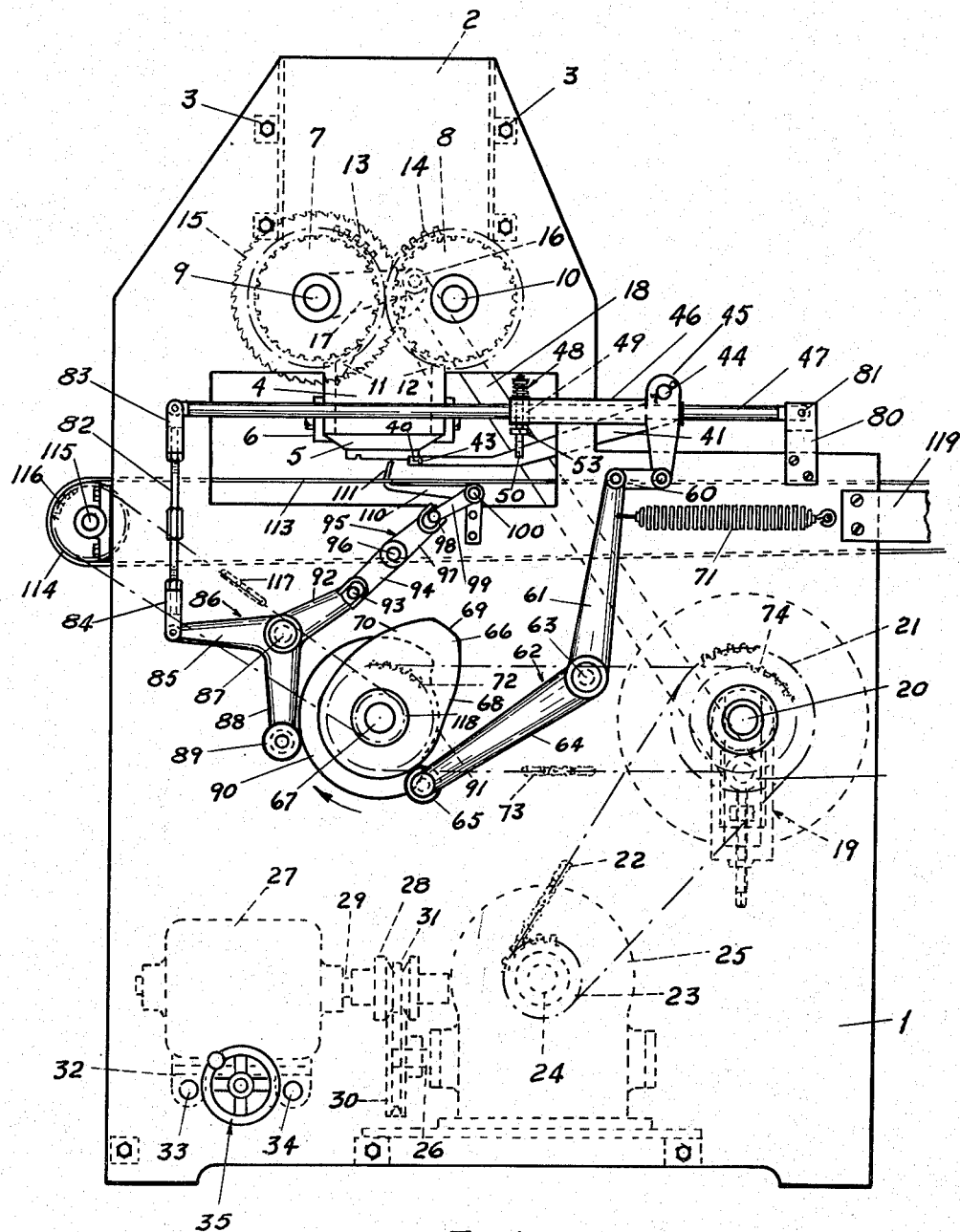
Fig. 1 is a side elevation of a preferred apparatus for practicing the invention.

Referring to Fig. 1, it will be seen that the apparatus comprises a pair of supporting plates, one of which is shown at 1, having a dough-receiving hopper 2 supported at the upper portion thereof as by the bolts 3. Below the hopper and communicating therewith, is a chamber 4, to the bottom of which a die in the form of a transversely extending series of identical die units, one of which is shown at 5, is securely fastened by means of clamp 6. The die will be described in detail below. Means for feeding dough to the chamber 4 and to the upper side of the die are provided in the form of a pair of spaced, grooved feed rollers 7 and 8 mounted on the shafts 9 and 10, respectively. Scrapers 11 and 12 adjacent each roller serve to direct the dough into the chamber 4. Shaft 9, which is the driven shaft, carries a gear 13 on the other side of the hopper which engages gear 14 on shaft 10 and thus drives the roller 8. Shaft 9 is conventionally driven through the ratchet wheel 15 which is mounted thereon and which in turn is rotatable by means of pawl 16 mounted on lever 17 which rocks freely on shaft 9. Pawl 16 and lever 17 are actuated by the connecting rod 18 which is connected at one end to lever 17 and at the other end to the adjustable crank generally designated as 19. The crank is mounted on a shaft 20, which carries sprocket 21 through which it is driven by chain 22 and sprocket 23, the latter being mounted on the slow speed shaft 24 of worm gear speed reducer 25. The high speed shaft 26 of the reducer is driven by motor 27 through the pulley 28 on motor shaft 29, pulley 30 on shaft 26, and belt 31. Motor 27 is carried on a sliding base 32 mounted on slide rails 33 and 34. Transverse movement of the motor may be controlled by means of a handwheel and screw generally indicated at 35.

As dough is extruded through the die, it is severed at regular and appropriate intervals by a movable cutter, preferably a filamentary cutter such as the wire 40, disposed below the die and in contact with the extrusion face thereof. The wire extends transversely of the die and is supported at each end as well as intermediately thereof, by arms 41. The wire passes through an opening 42 (Fig. 3) in each arm and is secured to the end arms as by means of screws 43.

As described, the invention provides means for moving the cutter back and forth transversely of the die in a continuous series of cutting and return strokes, and in a preferred form such means may comprise the following combination of parts. A transversely extending shaft 44 is provided which is supported at each end on the rear portion 45 of a slide bearing 46, the latter being mounted for sliding movement on the slide rail 47. Each arm 41 is rockably mounted on the shaft 44, and as each slide bearing moves back and forth along rail 47, in a manner described below, arms 41 and the cutting wire 40 are moved back and forth across the die. In order to prevent the dough from clinging to the cutter, the latter is moved at the end of each cutting stroke in a direction substantially opposite the direction of extrusion. Means for accomplishing this step, generally speaking, may be arranged to act on the wire 40, or on arms 41, or on the shaft 44, but as shown, and as is preferred, they are arranged to act on arms 41, and as is also preferred, are in the form of biasing means designated generally at 48 (Figs. 1 and 3). Means 48 comprise a transverse bar 49 supported at each end on the forward portion of each slide bearing 46. Yoke pins 50 extend through the end and intermediate portions of bar 49 and are attached at their lower ends to an arm 41. Each pin 50 is constantly urged upwardly by the spring 51 (Fig. 2) which is seated between bar 49 and the pin-held plate 52. Upward movement of pin 50 and arm 41 is limited by a collar 53. As will be appreciated, by the foregoing arrangement the cutter 40 will be maintained in contact with the extrusion face of the die, and such contact is maintained throughout the cutting stroke. At the end of the cutting stroke, that is to say, beyond the peripheral edge of a cut unit or units, a transverse recess or slot 54 is provided in the die face to receive the cutter, and upon reaching this recess the cutter is snapped into it by the action of the biasing means 48. Such angular movement of the cutter serves to separate it effectively and cleanly from the dough. Means for lubricating the cutter in the form of an oil-impregnated felt strip 55 (Fig. 3) may be placed in the slot 54 to facilitate the cutting action.

Returning now to the slide bearing 46 and to the manner in which it is moved back and forth along the rail 47 (there are, of course, two such bearings and two rails), it will be noted that the portion 45 of the bearing is connected at the lower end thereof to a link 60 and this in turn is connected to the upper branch 61 of the rocker arm 62 which is pivoted at 63. The lower branch 64 of the arm carries a roller 65 which rides on the cam 66, the latter being mounted on the shaft 67 for rotation in the direction shown by the arrow. Cam 66 may be described as having a descending portion 68, a peak 69, and an ascending portion 70. Roller 65 is maintained in contact with cam 66 by virtue of the spring 71 which is connected to branch 61 and to the frame 1, as indicated. Mounted on shaft 67 is a sprocket 72 which is driven through the chain 73 by the sprocket 74 mounted on the shaft 20. As will be evident, rotation of cam 66 on shaft 67 will actuate the rocker arm 62 and lever 60 to move each slide bearing 46 back and forth along slide rails 47.

Provision is also made for the fact that the cutting wire 40, which at the end of each cutting stroke is lodged in the slot 54, must be moved downwardly before it can begin the return stroke. For this purpose, each slide rail 47 is pivoted at its back end to yoke 80 by means of pin 81, and at its forward end it is pivoted to the connecting rod 82 through the connecting rod end 83. Rod 82, which is provided with right and left hand threads for adjustment, in turn is pivoted through the end 84 to the side branch 85 of the three-pronged rocker arm 86. The latter is pivoted at 87 and has a lower branch 88 upon the end of which a roller 89 is mounted which engages a cam 90. The cam rotates on the same shaft as the cam 66 and has what may be called a valley portion 91. The upper branch 92 of the rocker arm 86 carries a pin 93 which engages an arm 94 of the lever 95, the latter being pivoted at 96. Upper arm 97 of the lever is also adapted to receive a pin 98 of the lever 99 which is fastened to the rotatable transverse shaft 100. It will be appreciated that when the roller 89 engages the valley portion 91 of cam 90, the rocker arm 86 will move in a counterclockwise direction, and thus the slide rails 47 will be drawn downwardly far enough to enable the cutter to clear the slot 54. While the cutter is in this position, roller 65 of branch 64 of rocker arm 62 will be traversing the portion 70 of cam 66; in other words, the rocker arm 62 will be urged in a clockwise direction, and the slide bearing 46 plus arm 41 and cutter 40 will move to the right as seen in Fig. 1.

Means are also provided for supporting and restraining each pretzel unit during the cutting stroke against the drawing action of the cutter. Such means may comprise a pair of arms for each pretzel unit, one of which is shown at 110. The arms are mounted on, and are rotatable with, the shaft 100 (Figs. 1 and 2). Each arm terminates in an upwardly extending finger 111 which, during a cutting stroke, engages a loop of the pretzel unit 112 (Fig. 4) and thus supports the same against distortion. As each unit is cut, it falls downwardly along the fingers of two adjacent arms (Fig. 5) to continuously moving conveyors 113, and coincidently therewith each arm is moved downwardly by the same means as the slide rails 47 in order to begin the return stroke of the cutter (Fig. 6).

The conveyors 113 are supported on and driven by pulleys, one of which is shown at 114 (Fig. 1) mounted on the shaft 115. Also on this shaft is a sprocket 116 driven through the chain 117 by the sprocket 118 on the shaft 67. The other end of the conveyors (not shown) may be extended to any suitable length by means of brackets, one of which is shown at 119.

As indicated above, the die of the foregoing apparatus not only serves to shape the desired product but it is so constructed as to insure an even, uniform flow of material from the extrusion face. A particular feature of the construction, as will be described, enables the material to become thoroughly united and consolidated within the die, that is, between the entrance and extrusion faces thereof. Referring to Fig. 3, it will be seen that the die unit 5 comprises three cavity portions or chambers: a lower product-shaping cavity 120 which opens in the lower or extrusion face of the die, an intermediate cavity 121, and a group of spaced material entrance openings 122 in the upper or entrance face of the die. In its preferred form, the die unit is made of three plates, each containing one of said cavity portions. Thus plate 123 has cavity 120; plate 124 has cavity 121; and plate 125 has the group of openings 122. The plates may be secured together in any suitable way, as by means of the screws 126. Plate 125 is common to all the die units and extends the full width of the apparatus (Fig. 2). It has several groups of the openings 122. Plates 123 and 124, on the other hand, are separate for each die unit of the series, the space 127 between these plates of adjacent units serving to accommodate an intermediate cutter-supporting arm 41.

Cavity 120 is in the form of a continuous pretzel-shaped slot (Fig. 2), although, of course, it may have any other suitable shape. Intermediate cavity 121, which communicates with cavity 120, is of the same form as the latter, as is also the group of openings 122 in the upper face which communicate with cavity 121. These openings, and the cavity 120, it will be noted, are of a width less than that of the intermediate cavity. The resistance encountered by the extrudable material in passing from cavity 121 to the narrower cavity 120 results in pressure being built up in cavity 121, and by virtue of its greater capacity, the latter cavity serves to equalize the pressure on the extrudable material. That is to say, the material is consolidated therein and voids are eliminated, so that the amount of material passing to the product-shaping cavity 120 is the same at all times. As also described, on the extrusion or exit face of the die unit 5 a cutter-receiving slot 54 is provided which is spaced from, and of less depth than, the cavity 120. This slot appears on the extrusion face of each die unit of the series.

In the operation of the apparatus, dough in the hopper 2 is continuously fed to the die, extruded, and severed. In Fig. 1, it may be noted that the position of the various parts corresponds to the beginning of a cutting stroke. As the descending portion 68 of cam 66 moves past the roller 65 of rocker arm 62, the slide bearing 46 plus arm 41 and cutter 40 will all move to the left as seen in the figure. Biasing means 48 serves to keep the cutter in contact with the extrusion face of the die during the cutting stroke. When the peak portion 69 of cam 66 is in contact with roller 65, the cutter 40 will be at the end of the cutting stroke, in other words at the recess 54, and will be snapped into the recess by the action of the biasing means. Meanwhile, the cut pretzel units, the loops of which are "threaded" by the fingers 111, fall along such fingers to the conveyors, and coincidently therewith the fingers themselves are lowered, as will be described, so as not to impede the movement of the pretzel units on the conveyors. At the time when the peak portion 69 of cam 66 is in contact with roller 65, the valley portion 91 of cam 90 will begin to engage roller 89 of the rocker arm 86. This will cause the branch 88 to move to the right, as seen in Fig. 1, and levers 95 and 99 will then be actuated to rotate shaft 100 counterclockwise and thus to move the arms 110 and fingers 111 downwardly. Coincidently with the latter movement, rods 82 will also be urged downwardly and in turn will pivot each slide rail 47 and slide bearing 46 in the same direction. In the result, the cutter 40 will be moved out of the slot 54 in preparation for its return stroke, which will begin as the ascending portion 70 of cam 66 comes into contact with the roller 65. Throughout the return stroke, the cutter 40 and the fingers 111 will be maintained in a "down" position and will be moved upwardly only after the valley portion 91 of cam 90 has traversed the roller 89. When this happens, the cutter will be in position for the next cutting stroke.

It will be appreciated that while the invention has been described in connection with a preferred embodiment, it is capable of obvious variations without departing from its scope.

In the light of the foregoing description, the following is claimed:

1. In apparatus for producing units of extruded material the combination of a die, means for feeding extrudable material to one side of the die for extrusion therethrough, a movable filamentary cutter on the other side of the die for cutting extruded material into units, means independent of the die for engaging each unit and supporting said unit against the action of the cutter, means for moving said cutter back and forth across the die in a continuous series of cutting and return strokes, spring means operable on the cutter for angularly moving the latter after each cutting stroke in a direction substantially the reverse of that of the material being extruded, said die having an opening on the other side thereof beyond a peripheral edge of a cut extruded unit but within the confines of said other side of the die for receiving said angularly moving cutter, and means in said opening for lubricating the cutter.

2. In apparatus for producing units of extruded material the combination of a die, means for feeding extrudable material to one side of the die for extrusion therethrough, a movable filamentary cutter on the other side of the die for cutting extruded material into units, means independent of the die for engaging each unit and supporting said unit against lateral displacement from the die by the action of the cutter, means for moving said cutter back and forth across the die in a continuous series of cutting and return strokes, means acting on the cutter for biasing the same in a direction substantially the opposite of the direction of movement of the material being extruded, said die having an opening on said other side thereof and beyond a peripheral edge of a cut extruded unit for receiving said biased cutter.

3. In apparatus for producing units of extruded material comprising a die, means for feeding extrudable material to one side of the die for extrusion therethrough, a movable filamentary cutter on the other side of the die for cutting extruded material into units, and said cutter being laterally movable in a direction substantially parallel to the said other die side, the combination therewith of means within the confines of said other die side for engaging the cutter and holding it against said lateral movement, and means movable with and out of contact with the cutter for biasing the same into enagement with said engaging and holding means.

4. In apparatus for producing units of extruded material comprising a die, means for feeding extrudable material to one side of the die for extrusion therethrough, a movable cutter on the other side of the die for cutting extruded material into units, and a pair of movable cutter supporting members, the combination therewith of means movable with and engaging said cutter supporting members for biasing the cutter in a direction substantially opposite the direction of movement of the material being extruded, a unit supporting member movable toward and from said die for preventing each unit from being laterally displaced from the die by the action of the cutter, and said die having an opening beyond the peripheral edge of a cut extruded unit for receiving said cutter.

IRWIN ELLIOTT.

References Cited in the file of this patent
UNITED STATES PATENTS

| Number | Name | Date |
|---|---|---|
| 209,365 | Smith | Oct. 29, 1878 |
| 239,743 | Duesh | Apr. 5, 1881 |
| 248,613 | Ruger | Oct. 25, 1881 |
| 278,318 | De Tambel | May 29, 1883 |
| 598,404 | Weichert | Feb. 1, 1898 |
| 1,779,876 | Gay | Oct. 28, 1930 |
| 2,062,338 | Tanzi | Dec. 1, 1936 |
| 2,217,135 | Parrish | Oct. 8, 1940 |
| 2,295,027 | Callicott | Sept. 8, 1942 |
| 2,351,493 | Curry | June 13, 1944 |